(12) United States Patent
Wang et al.

(10) Patent No.: US 9,307,209 B2
(45) Date of Patent: Apr. 5, 2016

(54) LIGHTING SYSTEM AND DIGITAL CINEMA PROJECTION APPARATUS EMPLOYING SAME

(71) Applicant: DELTA ELECTRONICS, INC., Taoyuan Hsien (TW)

(72) Inventors: Bor Wang, Taoyuan Hsien (TW); Chien-Hao Hua, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 267 days.

(21) Appl. No.: 13/971,915

(22) Filed: Aug. 21, 2013

(65) Prior Publication Data

US 2014/0293244 A1 Oct. 2, 2014

(30) Foreign Application Priority Data

Mar. 28, 2013 (TW) .............................. 102111072 A

(51) Int. Cl.
G03B 21/14 (2006.01)
H04N 9/31 (2006.01)

(52) U.S. Cl.
CPC ........... *H04N 9/3158* (2013.01); *H04N 9/3182* (2013.01)

(58) Field of Classification Search
CPC .......... G03B 21/14; G03B 21/32; H04N 9/31; F32V 9/00
See application file for complete search history.

(56) References Cited

U.S. PATENT DOCUMENTS

| 5,986,815 | A | * | 11/1999 | Bryars | 359/634 |
| 2003/0151725 | A1 | * | 8/2003 | Hayashi et al. | 353/31 |
| 2005/0128439 | A1 | * | 6/2005 | Yoshida et al. | 353/84 |
| 2006/0018514 | A1 | * | 1/2006 | Bankhead | 382/108 |
| 2009/0268102 | A1 | * | 10/2009 | Barazza | 348/744 |
| 2010/0128259 | A1 | * | 5/2010 | Bridges et al. | 356/138 |
| 2012/0120253 | A1 | * | 5/2012 | Corley | G01J 3/0262 348/180 |

FOREIGN PATENT DOCUMENTS

| CN | 1463385 | 12/2003 |
| CN | 1512260 | 7/2004 |
| TW | 200611052 | 4/2006 |

* cited by examiner

*Primary Examiner* — Sultan Chowdhury
*Assistant Examiner* — Danell L Owens
(74) *Attorney, Agent, or Firm* — Kirton McConkie; Evan R. Witt

(57) ABSTRACT

A lighting system for a digital cinema projection apparatus is provided. The lighting system includes an ultra high pressure mercury lamp, a relay lens group, a digital micro display module, an optical filter module, and a projection lens. The ultra high pressure mercury lamp is used for emitting a light beam. The relay lens group is used for receiving the light beam and adjusting an optical path of the light beam. The optical filter module is arranged along the optical path of the lighting system for optically modulating an optical spectrum and/or a white balance of the light beam from the ultra high pressure mercury lamp. The projection lens is used for projecting the modulated light beam as an image beam.

13 Claims, 9 Drawing Sheets

1A

LIGHTING SYSTEM AND DIGITAL CINEMA PROJECTION APPARATUS EMPLOYING SAME

FIELD OF THE INVENTION

The present invention relates to a lighting system, and more particularly to a lighting system for a digital cinema projection apparatus by using an ultra high pressure mercury lamp as a light source.

BACKGROUND OF THE INVENTION

Nowadays, a variety of digital cinema projection apparatuses use a digital light processing (DLP) technology to perform digital projection. For meeting the brightness request to project image onto a large-size screen and complying with the color request which was developed by Digital Cinema Initiative (DCI), the lighting system for the conventional digital cinema projection apparatus is usually equipped with a xenon lamp as a light source. Since the optical spectrum of the xenon lamp in the visible light range is close to the sunlight spectrum, the xenon lamp may readily achieve the color request for DCI. In addition, the xenon lamp can output power in a very wide range. For example, since the power range of the xenon lamp is from 1200 W to 7000 W, the xenon lamp is sufficient to project digital cinema onto a large-size screen. However, the xenon lamp still has some drawbacks. For example, the xenon lamp has bulky volume, low power conversion efficiency and high cost. Because of these drawbacks, it is difficult to reduce the volume and cost of conventional digital cinema projection apparatus.

Generally, the small-sized optical projection apparatus does not need to comply with the color request of DCI. Since it is not necessary for the small-sized optical projection apparatus to project the wide-range image onto the large-size screen, the small-sized optical projection apparatus is usually equipped with an ultra high pressure (UHP) mercury lamp as a light source. Since the UHP mercury lamp has many benefits such as low cost, small volume and long life, the use of the UHP mercury lamp is helpful for reducing the overall cost of the whole optical projection apparatus. However, since the optical spectrum of the UHP mercury lamp is not close to the sunlight spectrum, the use of the UHP mercury lamp in the digital cinema projection apparatus fails to comply with the color request of DCI.

Therefore, there is a need of providing a lighting system for a digital cinema projection apparatus by using an ultra high pressure mercury lamp as a light source in order to comply with the color request of DCI and reduce the overall volume and cost.

SUMMARY OF THE INVENTION

The present invention provides a lighting system for a digital cinema projection apparatus by using an ultra high pressure mercury lamp as a light source. The lighting system has an optical filter module for adjusting the output color gamut and modulating the white balance. Consequently, the output color of the lighting system of the present invention can comply with the DCI color request. Moreover, the use of the UHP mercury lamp is helpful for reducing the overall cost and volume of the digital cinema projection apparatus and prolonging the use life of the digital cinema projection apparatus.

In accordance with an aspect of the present invention, there is provided a lighting system for a digital cinema projection apparatus. The lighting system includes an ultra high pressure mercury lamp, a relay lens group, a digital micro display module, an optical filter module, and a projection lens. The ultra high pressure mercury lamp is used for emitting a light beam. The relay lens group is used for receiving the light beam and adjusting an optical path of the light beam. The optical filter module is arranged along the optical path of the lighting system for optically modulating an optical spectrum and/or a white balance of the light beam from the ultra high pressure mercury lamp. The projection lens is used for projecting the modulated light beam as an image beam.

In accordance with another aspect of the present invention, there is provided a lighting system for a digital cinema projection apparatus. The lighting system includes an ultra high pressure mercury lamp, a relay lens group, a digital micro display module, an optical filter module, and a projection lens. The ultra high pressure mercury lamp is used for emitting a light beam. The relay lens group is used for receiving the light beam and adjusting an optical path of the light beam. The optical filter module is arranged along the optical path of the lighting system for optically modulating an optical spectrum and/or a white balance of the light beam from the ultra high pressure mercury lamp, wherein the optical filter module comprises a notch filter with a notch wavelength range between 535 nm and 625 nm. The projection lens is used for projecting the modulated light beam as an image beam.

In accordance with a further aspect of the present invention, there is provided a digital cinema projection apparatus. The digital cinema projection apparatus includes a lighting system and a projection screen. The lighting system includes an ultra high pressure mercury lamp, a relay lens group, a digital micro display module, an optical filter module, and a projection lens. The ultra high pressure mercury lamp is used for emitting a light beam. The relay lens group is used for receiving the light beam and adjusting an optical path of the light beam. The optical filter module is arranged along the optical path of the lighting system for optically modulating an optical spectrum and/or a white balance of the light beam from the ultra high pressure mercury lamp. The projection lens is used for projecting the modulated light beam as an image beam. The image beam is projected on the projection screen.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
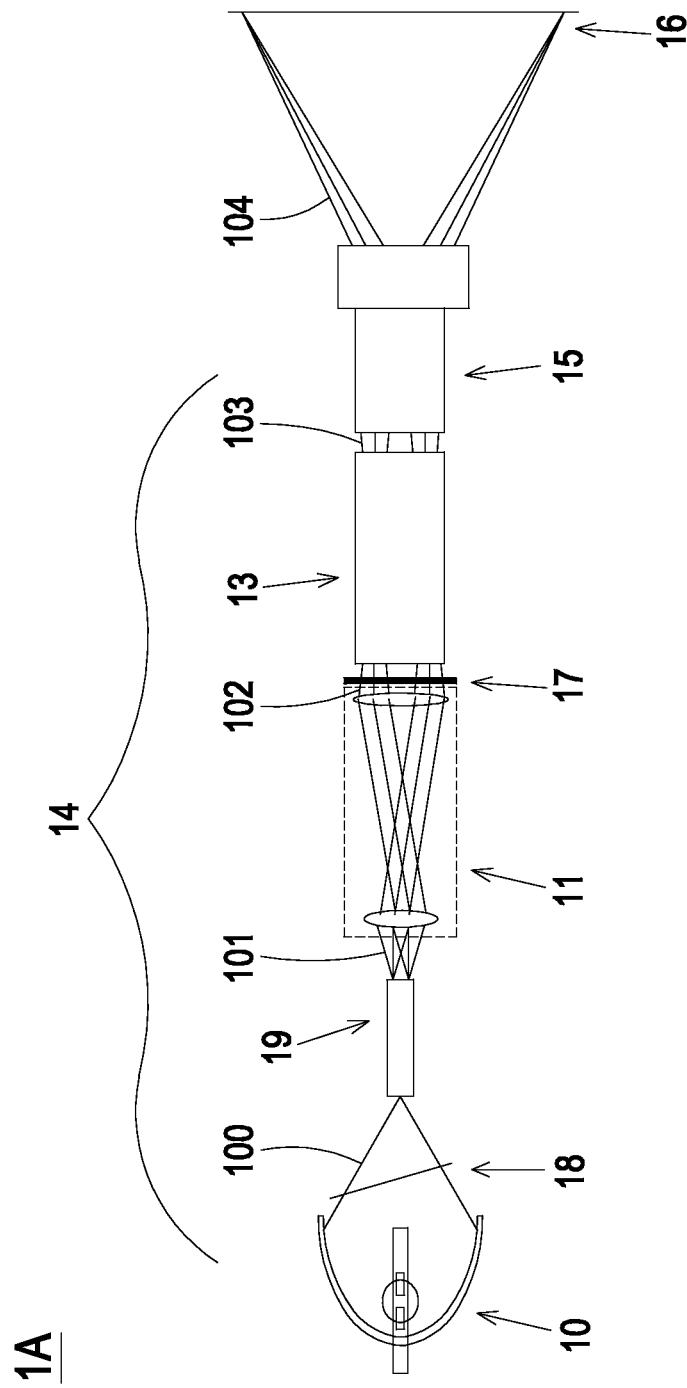
FIG. 1A schematically illustrates the architecture of a lighting system for a digital cinema projection apparatus according to a first embodiment of the present invention.

FIG. 1A schematically illustrates the architecture of a lighting system for a digital cinema projection apparatus according to a first embodiment of the present invention. As shown in FIG. 1A, the lighting system 14 is installed in a digital cinema projection apparatus 1A. By the lighting system 14, an image beam 104 is projected onto a projection screen 16. The lighting system 14 comprises a light source 10, a relay lens group 11, an optical filter module 17, a digital micro display module 13, and a projection lens 15. The digital micro display module 13 comprises a digital micro display device (not shown), a color-splitting prism (not shown), a color-combining prism (not shown) and other optical elements. An example of the digital micro display device includes but is not limited to a liquid crystal display (LCD), a liquid crystal on silicon (LCoS) or a digital micro-mirror device (DMD). The examples of the digital micro display device are well known to those skilled in the art, and are not redundantly described herein. In this embodiment, the digital micro display module 13 comprises a digital micro-mirror device (DMD).

Please refer to FIG. 1A again. The light source 10 of the lighting system 14 is a high pressure mercury lamp, for example an ultra high pressure (UHP) mercury lamp, for emitting a light beam 100. By the relay lens group 11, the optical path of the light beam 100 is adjusted. The adjusted light beam 102 is modulated by the digital micro display module 13 as a modulated light beam 103. The modulated light beam 103 is processed into the image beam 104 by the projection lens 15. The image beam 104 is projected on the projection screen 16 to result in an image frame. In this embodiment, the optical spectrum and/or the white balance of the light beam 100 from the UHP mercury lamp 10 is optically modulated by the optical filter module 17. Consequently, the modulated image beam 104 can comply with the color request of DCI. In this embodiment, the optical filter module 17 is arranged along a main optical path of the lighting system 14. That is, the optical filter module 17 may be located at an arbitrary position along the optical path from the light source 10 to the projection screen 16. In this embodiment, the optical filter module 17 is arranged between the relay lens group 11 and the digital micro display module 13. It is noted that the position of the optical filter module 17 may be varied according to the practical requirements.

Figure 2A:
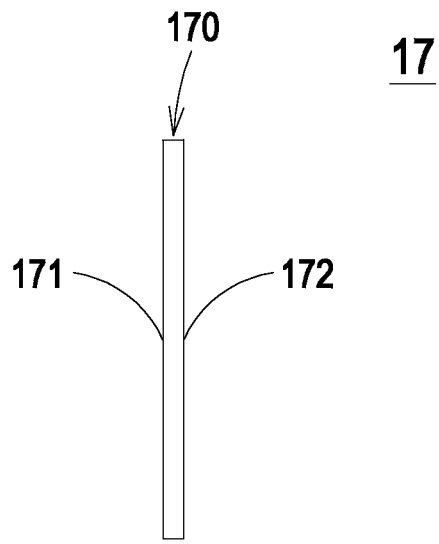
FIGS. 2A and 2B schematically illustrate two exemplary optical filter modules used in the lighting system of FIG. 1A.
Figure 2B:
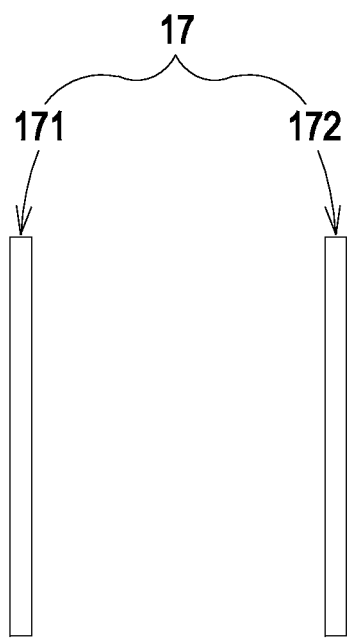

FIGS. 2A and 2B schematically illustrate two exemplary optical filter modules used in the lighting system of FIG. 1A. As shown in FIG. 2A, the optical filter module 17 comprises a notch filter 171 and a neutral density filter (also referred as a ND filter) 172. The notch filter 171 is used for intercepting the light corresponding to some specified wavelengths in order to modulate the optical spectrum of the light beam 102. The ND filter 172 is used for modulating the white balance of the light beam 102 such that the modulated image beam 104 can comply with the color request of DCI. In some embodiments, as shown in FIG. 2A, the notch filter 171 and the ND filter 172 are formed on two opposite surfaces of a single optical element 170. Consequently, the single optical element 170, the notch filter 171 and the ND filter 172 are collaboratively defined as the optical filter module 17. That is, the optical filter module 17 is produced by coating two films on the two opposite surfaces of the optical element 170. Alternatively, in some other embodiments, the notch filter 171 and the ND filter 172 are two separated optical elements. The notch filter 171 and the ND filter 172 may be separately arranged along the optical path of the light beam 101, 102, 103 or 104 (see FIG. 1A). Moreover, the notch filter 171 may be located in the upstream or downstream of the ND filter 172. That is, the positions of the notch filter 171 and the ND filter 172 are not restricted as long as the image beam 104 modulated by the notch filter 171 and the ND filter 172 are capable of being projected onto the projection screen 16.

Please refer to FIG. 1A again. The lighting system 14 further comprises an IR/UV filter 18 and a light homogenization device 19. The IR/UV filter 18 is located near the UHP mercury lamp 10 for filtering off the IR component and the UV component. The light homogenization device 19 is arranged between the UHP mercury lamp 10 and the relay lens group 11. By the light homogenization device 19, the light beam 100 from the UHP mercury lamp 10 is adjusted as a homogenized telecentric light beam 101. In this embodiment, the optical filter module 17 is arranged between the relay lens group 11 and the digital micro display module 13, but is not limited thereto. For achieving the optimal modulating performance, the optical filter module 17 is preferably located at a telecentric position. For example, the telecentric position of the optical filter module 17 may be located between the relay lens group 11 and the digital micro display module 13 (see FIG. 1A). Alternatively, the telecentric position of the optical filter module 17 may be located between the light homogenization device 19 and the relay lens group 11. Alternatively, the telecentric position of the optical filter module 17 may be between the digital micro display module 13 and the projection lens 15. In other words, the position of the optical filter module 17 is not restricted as long as the optical filter module 17 is arranged along the optical path of the telecentric light beam 101, 102, 103 or 104. Consequently, the purpose of the optical modulation is achieved. It is noted that the optical filter module 17 may be located at a non-telecentric position while retaining the teachings of the invention. However, the optical modulating performance of the optical filter module at the non-telecentric position is inferior to the optical modulating performance of the optical filter module at the telecentric position.

Figure 1B:
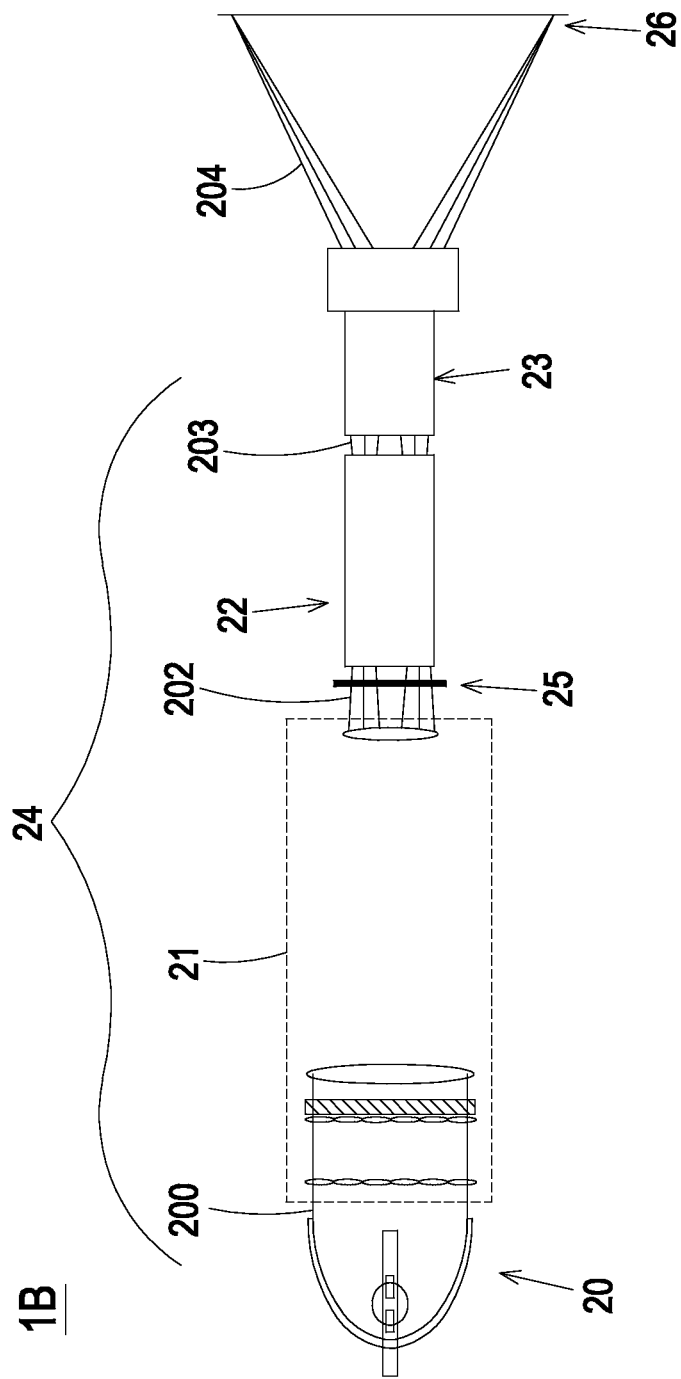
FIG. 1B schematically illustrates the architecture of a lighting system for a digital cinema projection apparatus according to a second embodiment of the present invention.

FIG. 1B schematically illustrates the architecture of a lighting system for a digital cinema projection apparatus according to a second embodiment of the present invention. As shown in FIG. 1B, the lighting system 24 is installed in a digital cinema projection apparatus 1B. By the lighting system 24, an image beam 204 is projected onto a projection screen 26. The lighting system 24 comprises a light source 20, a relay lens group 21, an optical filter module 25, a digital micro display module 22, and a projection lens 23. In comparison with the first embodiment of FIG. 1A, the digital micro display module 22 comprises a liquid crystal display (LCD), and thus the optical elements of the relay lens group 21 are correspondingly changed. Similarly, the light source 20 of the lighting system 24 is a high pressure mercury lamp, for example an ultra high pressure (UHP) mercury lamp, for emitting a light beam 200. By the optical elements (not shown) within the relay lens group 21, the optical path of the light beam 200 is adjusted. The adjusted light beam 202 is modulated by the digital micro display module 23 as a modulated light beam 203. The optical filter module 25 is arranged along the optical path of the lighting system 24 for performing optical modulation. In this embodiment, the optical filter module 25 is arranged between the relay lens group 21 and the digital micro display module 22. For achieving the optimal modulating performance, the optical filter module 25 is preferably located at the optical path of the telecentric light beam 200, 202 or 203. The modulated light beam 203 is processed into the image beam 204 by the projection lens 25. The image beam 204 is projected onto the projection screen 26 to result in an image frame. In this embodiment, the optical spectrum and/or the white balance of the light beam 200 from the UHP mercury lamp 20 is optically modulated by the optical filter module 25. Consequently, the modulated image beam 204 can comply with the color request of DCI.

Figure 3A:
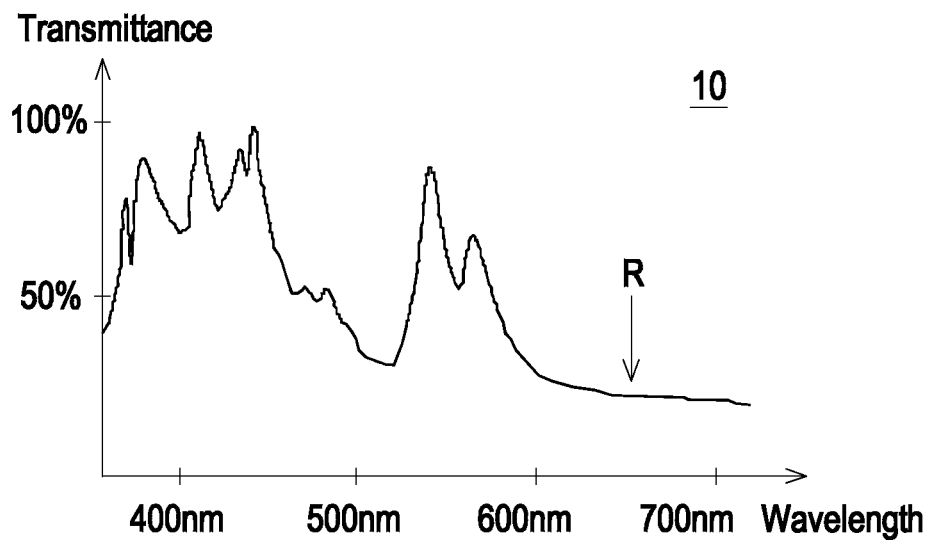
FIG. 3A illustrates the optical spectrum of the ultra high pressure mercury lamp used in the lighting system according to the first embodiment of the present invention.
Figure 3B:
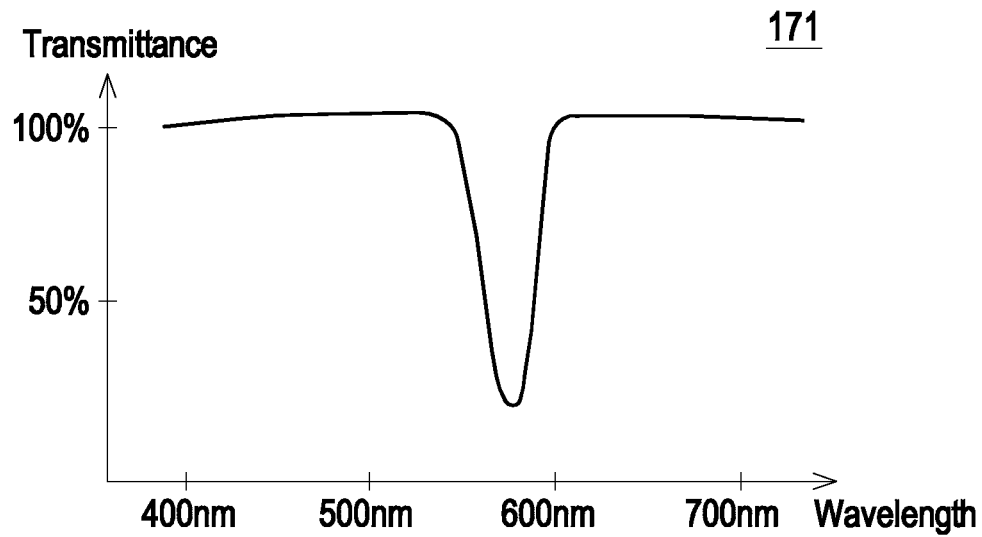
FIG. 3B illustrates the transmission spectrum of the notch filer used in the lighting system according to the first embodiment of the present invention.
Figure 4:
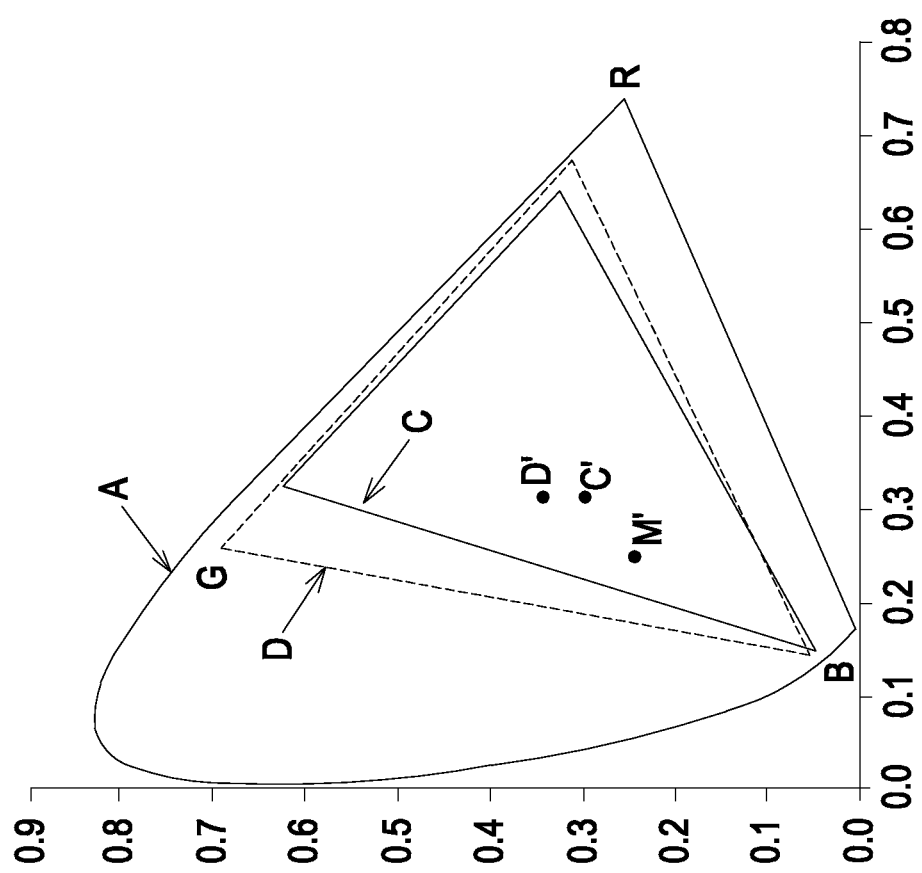
FIG. 4 schematically illustrates the color gamut of the ultra high pressure mercury lamp, the color gamut of the combination of the high pressure mercury lamp and the notch filer and the color gamut of the DCI request.

FIG. 3A illustrates the optical spectrum of the ultra high pressure mercury lamp used in the lighting system according to the first embodiment of the present invention. FIG. 3B illustrates the transmission spectrum of the notch filer used in the lighting system according to the first embodiment of the present invention. FIG. 4 schematically illustrates the color gamut of the ultra high pressure mercury lamp, the color gamut of the combination of the high pressure mercury lamp and the notch filer and the color gamut of the DCI request.

As shown in FIGS. 1A and 3A, the light intensity of the red spectrum (in the wavelength range of 600~700 nm) of the UHP mercury lamp 10 used in the lighting system of the present invention is very low. Since the light intensity of the red spectrum of the UHP mercury lamp 10 is much lower than the xenon lamp, the UHP mercury lamp 10 fails to be directly used in the conventional digital cinema projection apparatus.

For example, the DCI color gamut request for the digital cinema projection apparatus may be described as follows. That is, Red(x,y): x=0.680±0.01, y=0.320±0.01; Green(x,y): x=0.265±0.02, y=0.692±0.02; Blue(x,y): x=0.150+0.01~0.03, y=0.690+0.01~0.04. Moreover, the target color coordinate of the white balance is denoted as White(x,y): x=0.314, y=0.351. For matching the UHP mercury lamp 10, the notch filter 171 has a transmission spectrum as shown in FIG. 3B. The notch filter 171 has the following optical conditions: the transmittance is 97% in the wavelength range of 420 nm-538 nm, the transmittance is 97% in the wavelength range of 622 nm-680 nm, the transmittance is 50% in the wavelength range of 561 nm±5 nm, the transmittance is 50% in the wavelength range of 599 nm±5 nm, the wavelength difference in the transmittance range between 30% and 90% is smaller than 20 nm, the minimum transmittance is 15%—19%, and the wavelength corresponding to the minimum transmittance is about 580 nm±5 nm. In case that the center value of the wavelength corresponding to the minimum transmittance is about 580 nm, after the light beam 101 from the UHP mercury lamp 10 is filtered by the notch filter 171, the color gamut is modulated. Consequently, the color gamut lies within the dash line triangle zone D as shown in FIG. 4. Moreover, the simulation according to the above optical conditions has the results as shown in Table 1.

TABLE 1

| UHP mercury lamp | | UHP mercury lamp + notch filter | |
|---|---|---|---|
| White(x, y) | (0.282, 0.298) | White(x, y) | (0.250, 0.260) |
| Red(x, y) | (0.662, 0.653) | Red(x, y) | (0.676, 0.321) |
| Green(x, y) | (0.323, 0.653) | Green(x, y) | (0.263, 0.702) |
| Blue(x, y) | (0.146, 0.017) | Blue(x, y) | (0.146, 0.047) |

According to the simulation results as shown in Table 1, the RGB color gamut complies with the DCI RGB color request, but the coordinate of the white balance is still away from the target value. For achieving the target value of the white balance, the green color intensity and the blue color intensity need to be further adjusted by optical modulation or electronic modulation.

Please refer to FIG. 4 again. The solid zone A denotes the color gamut of a visible light. The solid line triangle zone C denotes the color gamut of the UHP mercury lamp, wherein the point C' is the white balance point. For allowing the color gamut of the UHP mercury lamp 10 to approach the DCI color gamut (i.e. the dash line triangle zone D), the light beam from the UHP mercury lamp 10 should be modulated by the notch filter 171. Consequently, the modulated color gamut is close to the DCI color gamut (i.e. the dash line triangle zone D), wherein the point M' is the modulated white balance point. In other words, the modulated color gamut complies with the DCI color request, but the modulated white balance point M' is still away from the white balance point D' of the DCI color request. For achieving the target value of the white balance, the green color intensity and the blue color intensity need to be reduced by about 22% and 62%, respectively.

Figure 5A:
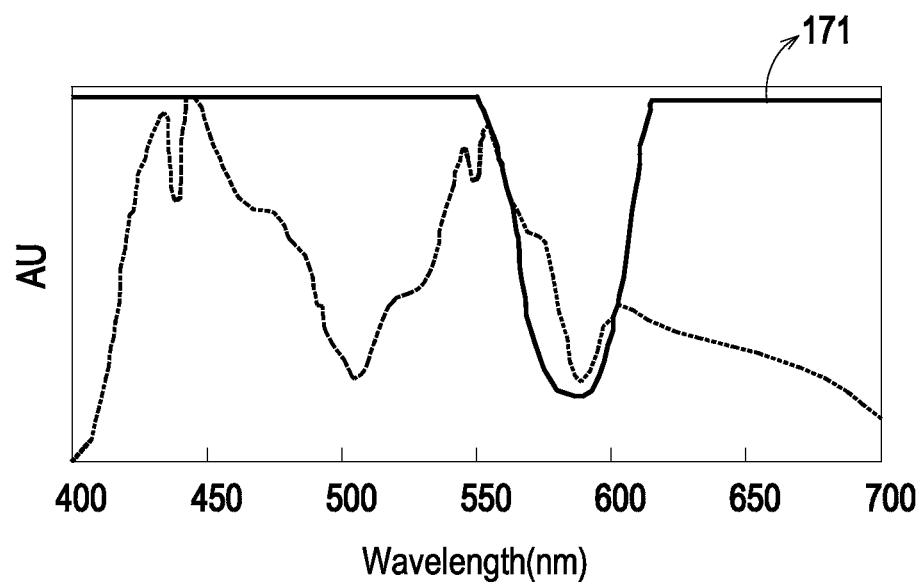
FIG. 5A illustrates the simulated transmission spectrum of the notch filer, in which the upper limit of the wavelength corresponding to the minimum transmittance is about 585 nm.

FIG. 5A illustrates the simulated transmission spectrum of the notch filer, in which the upper limit of the wavelength corresponding to the minimum transmittance is about 585 nm. The simulation according to the above optical conditions has the results as shown in Table 2.

TABLE 2

| UHP mercury lamp | | UHP mercury lamp + notch filter | |
|---|---|---|---|
| White(x, y) | (0.282, 0.298) | White(x, y) | (0.248, 0.269) |
| Red(x, y) | (0.662, 0.653) | Red(x, y) | (0.681, 0.316) |
| Green(x, y) | (0.323, 0.653) | Green(x, y) | (0.275, 0.693) |
| Blue(x, y) | (0.146, 0.017) | Blue(x, y) | (0.146, 0.047) |

According to the simulation results as shown in Table 2, the green color intensity and the blue color intensity need to be further reduced by about 31% and 64%, respectively.

Figure 5B:
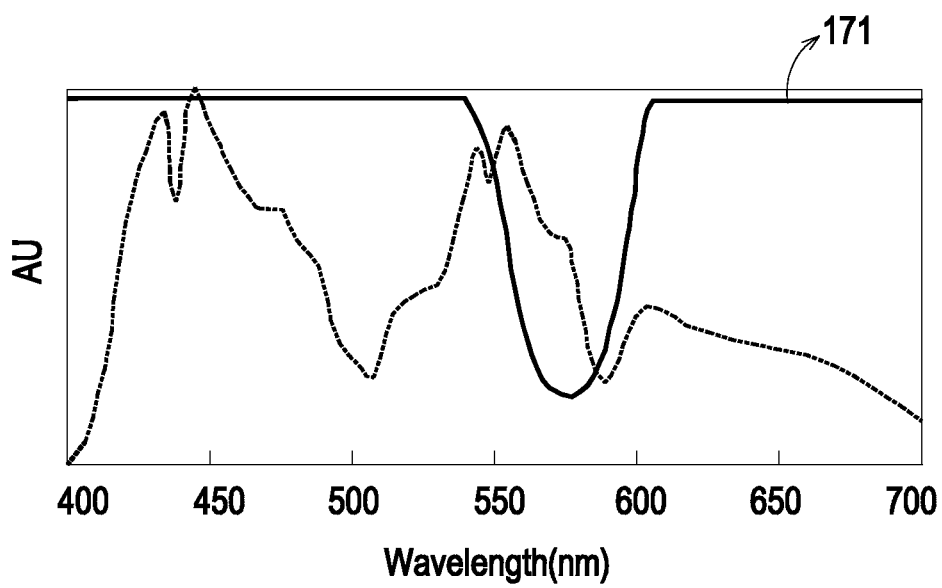
FIG. 5B illustrates the simulated transmission spectrum of the notch filer, in which the lower limit of the wavelength corresponding to the minimum transmittance is about 575 nm.

FIG. 5B illustrates the simulated transmission spectrum of the notch filer, in which the lower limit of the wavelength corresponding to the minimum transmittance is about 575 nm. The simulation according to the above optical conditions has the results as shown in Table 3.

TABLE 3

| | UHP mercury lamp | UHP mercury lamp + notch filter | |
|---|---|---|---|
| White(x, y) | (0.282, 0.298) | White(x, y) | (0.252, 0.250) |
| Red(x, y) | (0.662, 0.653) | Red(x, y) | (0.671, 0.326) |
| Green(x, y) | (0.323, 0.653) | Green(x, y) | (0.253, 0.708) |
| Blue(x, y) | (0.146, 0.017) | Blue(x, y) | (0.146, 0.047) |

According to the simulation results as shown in Table 3, the green color intensity and the blue color intensity need to be further reduced by about 10% and 60%, respectively.

From the above simulation results, it is found that if the wavelength corresponding to the minimum transmittance of the notch filer 171 is varied, the reduction extents of the green color intensity and the blue color intensity are different.

As previously described, the green color intensity and the blue color intensity may be adjusted by optical modulation or electronic modulation. When the electronic modulation is taken into consideration, if the green color intensity is largely reduced, the quality of the image signal may be adversely affected. Consequently, the reduction of the green color intensity should be as low as possible. It is found that the use of the neutral density filter 172 can achieve the above object.

Figure 6A:
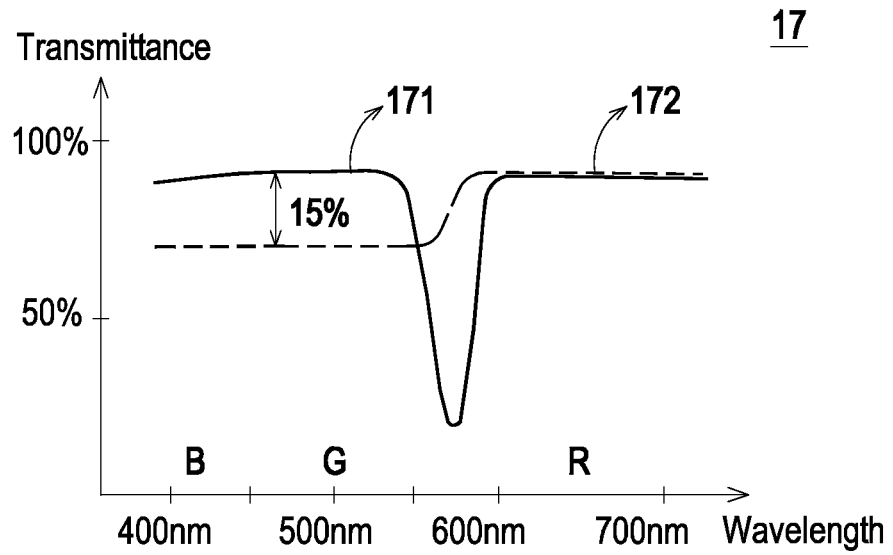
FIG. 6A illustrates the transmission spectrum of the notch filer and the neutral density filter of the lighting system according to a third embodiment of the present invention.
Figure 6B:
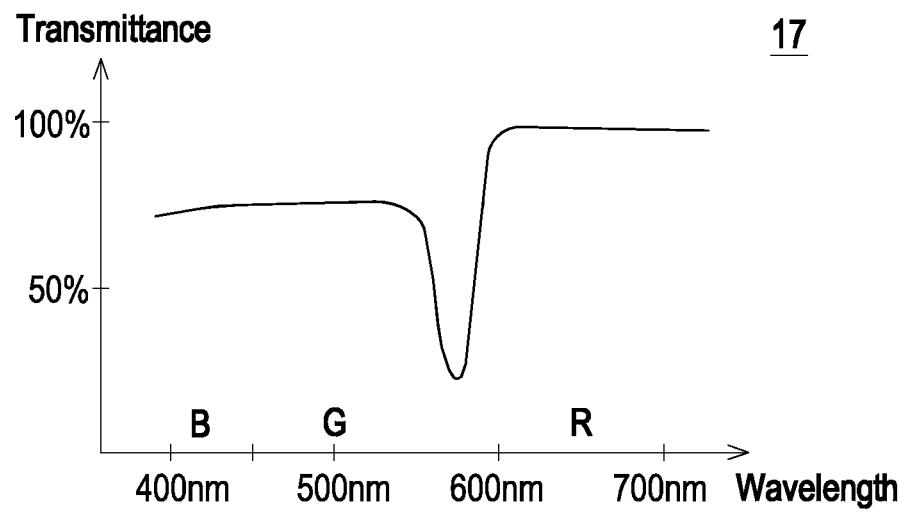
FIG. 6B illustrates the transmission spectrum of the combination of the notch filer and the neutral density filter after an equivalent light intensity modulation.

FIG. 6A illustrates the transmission spectrum of the notch filer and the neutral density filter of the lighting system according to a third embodiment of the present invention. As previously described, the green color intensity and the blue color intensity are still high after the optical modulation of the notch filer 171. Consequently, the green color intensity and the blue color intensity may be further reduced by the neutral density filter 172. For example, the neutral density filter 172 may be a two-stage neutral density filter with a simple structure. The neutral density filter 172 is capable of filtering off 15% of green light and 15% of blue light simultaneously. That is, both of the green color intensity and the blue color intensity green color intensity are reduced to 85% of the original intensities. After an equivalent light intensity modulation, the transmission spectrum of the combination of the notch filer and the neutral density filter is shown in FIG. 6B.

Figure 7A:
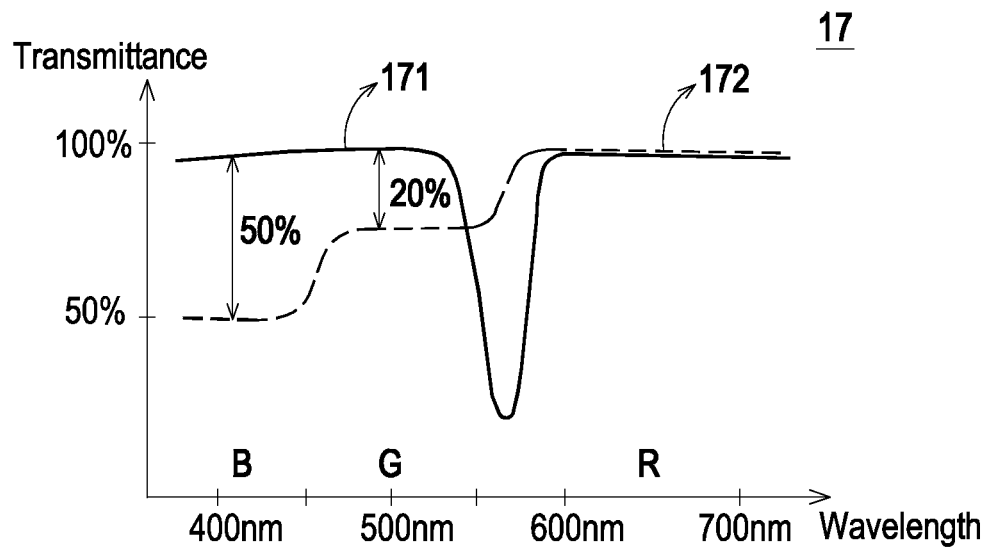
FIG. 7A illustrates the transmission spectrum of the notch filer and the neutral density filter of the lighting system according to a fourth embodiment of the present invention.
Figure 7B:
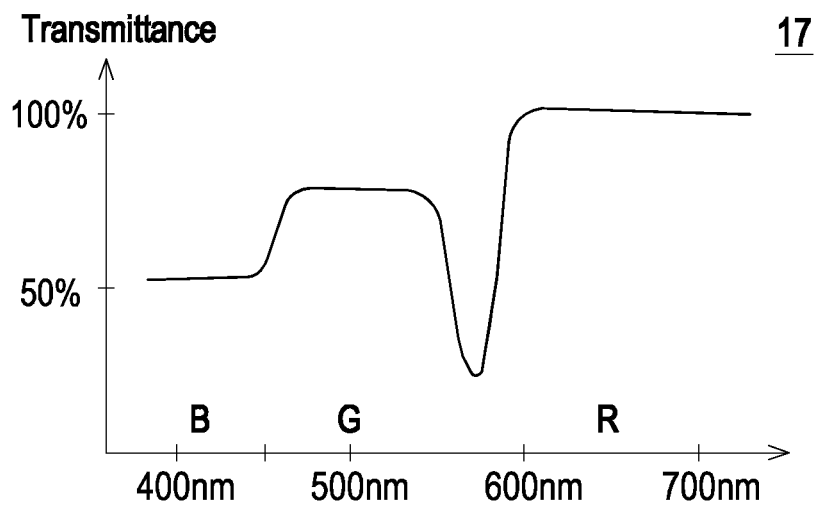
FIG. 7B illustrates the transmission spectrum of the combination of the notch filer and the neutral density filter after an equivalent light intensity modulation.

FIG. 7A illustrates the transmission spectrum of the notch filer and the neutral density filter of the lighting system according to a fourth embodiment of the present invention. In this embodiment, the neutral density filter 172 is a three-stage neutral density filter. The neutral density filter 172 is capable of filtering off different percentages of green light and blue light. As shown in FIG. 7A, the neutral density filter 172 is capable of filtering off 20% of green light and 50% of blue light simultaneously. That is, the green color intensity and the blue color intensity are reduced to 80% and 50% of the original intensities, respectively. After an equivalent light intensity modulation, the transmission spectrum of the combination of the notch filer and the neutral density filter is shown in FIG. 7B.

Figure 8:
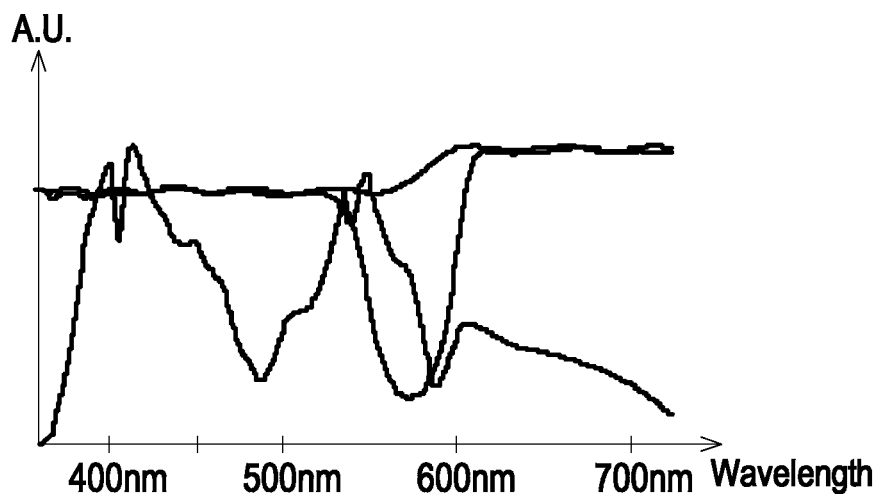
FIG. 8 illustrates the optical spectrum of the lighting system according to the first embodiment of the present invention.

From the above discussions, the combination of the notch filer 171 and the neutral density filter 172 of the optical filter module 17 is capable of optically modulating the optical spectrum and/or the white balance of the light beam from the ultra high pressure mercury lamp. FIG. 8 illustrates the optical spectrum of the lighting system according to the first embodiment of the present invention. As shown in FIG. 8, by the optical modulation of the optical filter module 17, the modulated image beam can comply with the color request of DCI and the image quality in the subsequent electronic adjustment will not be obviously deteriorated.

Figure 9:
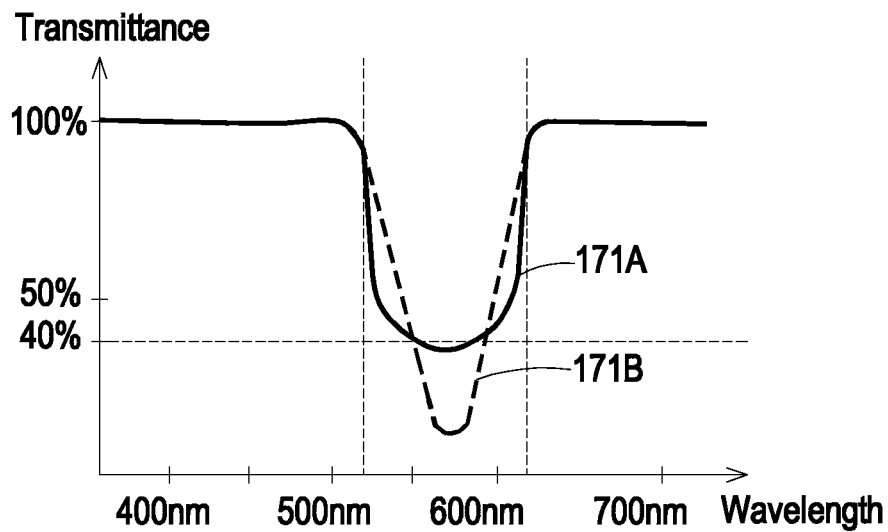
FIG. 9 schematically illustrates the notch wavelength range of the notch filter used in the lighting system according to the first embodiment of the present invention.

FIG. 9 schematically illustrates the notch wavelength range of the notch filter used in the lighting system according to the first embodiment of the present invention. For allowing the light beam from the UHP mercury lamp 10 of the digital cinema projection apparatus 1A to comply with the DCI color request, the notch filter 171 has a preferred notch wavelength range between 535 nm and 625 nm. Moreover, the minimum transmittance within this notch wavelength range is lower than 40%. As shown in FIG. 9, the notch filter 171A or 172B can satisfy the above requirements.

From the above descriptions, the present invention provides a lighting system for a digital cinema projection apparatus. The lighting system uses an ultra high pressure mercury lamp as a light source. Moreover, an optical filter module including a notch filer and a neutral density filter is arranged along an optical path of the lighting system for adjusting the output color gamut and modulating the white balance. Preferably, the optical filter module is located at a telecentric position. Consequently, the output color can comply with the DCI color request. Since the UHP mercury lamp has low cost, small volume and long life, the use of the UHP mercury lamp is helpful for reducing the overall cost and volume of the digital cinema projection apparatus and prolonging the use life of the digital cinema projection apparatus.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting system for a digital cinema projection apparatus, the lighting system comprising:
    an ultra high pressure mercury lamp for emitting a light beam;
    a relay lens group for receiving the light beam and adjusting an optical path of the light beam;
    a digital micro display module;
    an optical filter module comprising a notch filter and a neutral density filter is arranged along the optical path of the lighting system, said notch filter is for optically modulating an optical spectrum and said neutral density filter is for modulating a white balance of the light beam from the ultra high pressure mercury lamp so as to filter off at least 10% of green light and 15% of blue light of said light beam from the ultra high pressure mercury lamp; and
    a projection lens for projecting the modulated light beam as an image beam.

2. The lighting system according to claim 1, wherein the notch filter has a notch wavelength range between 535 nm and 625 nm.

3. The lighting system according to claim 2, wherein the minimum transmittance of the notch filter within the notch wavelength range between 535 nm and 625 nm is lower than 40%.

4. The lighting system according to claim 1, wherein the notch filter and the neutral density filter are formed on two opposite surfaces of a single optical element.

5. The lighting system according to claim 1, wherein the notch filter and the neutral density filter are two separated optical elements.

6. The lighting system according to claim 1, wherein the optical filter module is located at a telecentric position.

7. The lighting system according to claim 6, wherein the telecentric position is located between the relay lens group and the digital micro display module.

8. The lighting system according to claim 6, wherein the telecentric position is located between the digital micro display module and the projection lens.

9. The lighting system according to claim 6, wherein the digital micro display module comprises a digital micro-mirror device (DMD).

10. The lighting system according to claim 9, further comprising a light homogenization device, wherein the light homogenization device is arranged between the ultra high pressure mercury lamp and the relay lens group, wherein the telecentric position of the optical filter module is arranged between the light homogenization device and the relay lens group.

11. The lighting system according to claim 1, wherein the digital micro display module comprises a liquid crystal display (LCD) or a liquid crystal on silicon (LCoS) display.

12. A lighting system for a digital cinema projection apparatus, the lighting system comprising:
    an ultra high pressure mercury lamp for emitting a light beam;
    a relay lens group for receiving the light beam and adjusting an optical path of the light beam;
    a digital micro display module;
    an optical filter module comprising a notch filter and a neutral density filter is arranged along the optical path of the lighting system, said notch filter is for optically modulating an optical spectrum and said neutral density filter is for modulating a white balance of the light beam from the ultra high pressure mercury lamp so as to filter off at least 10% of green light and 15% of blue light of said light beam from the ultra high pressure mercury lamp, wherein said notch filter has a notch wavelength range between 535 nm and 625 nm; and
    a projection lens for projecting the modulated light beam as an image beam.

13. A digital cinema projection apparatus, comprising:
    a lighting system comprising:
        an ultra high pressure mercury lamp for emitting a light beam;
        a relay lens group for receiving the light beam and adjusting an optical path of the light beam;
        a digital micro display module;
        an optical filter module comprising a notch filter and a neutral density filter is arranged along the optical path of the lighting system, said notch filter is for optically modulating an optical spectrum and said neutral density filter is for modulating a white balance of the light beam from the ultra high pressure mercury lamp so as to filter off at least 10% of green light and 15% of blue light of said light beam from the ultra high pressure mercury lamp; and
        a projection lens for projecting the modulated light beam as an image beam; and
    a projection screen, wherein the image beam is projected on the projection screen.

\* \* \* \* \*